(12) United States Patent
Kovshov

(10) Patent No.: US 10,944,916 B2
(45) Date of Patent: Mar. 9, 2021

(54) AUTOMATED SYSTEM FOR CREATING, PROCESSING AND GENERATING VIDEOS

(71) Applicant: Mykhailo Hennadiiovych Kovshov, Kyiv (UA)

(72) Inventor: Mykhailo Hennadiiovych Kovshov, Kyiv (UA)

(73) Assignee: Mykhailo Hennadiiovych Kovshov, Kyiv (UA)

( * ) Notice: Subject to any disclaimer, the term of this patent is extended or adjusted under 35 U.S.C. 154(b) by 0 days.

(21) Appl. No.: 16/624,190

(22) PCT Filed: Jul. 18, 2017

(86) PCT No.: PCT/UA2017/000074
§ 371 (c)(1),
(2) Date: Jan. 31, 2020

(87) PCT Pub. No.: WO2018/236327
PCT Pub. Date: Dec. 27, 2018

(65) Prior Publication Data
US 2020/0154060 A1    May 14, 2020

(30) Foreign Application Priority Data
Jun. 19, 2017   (UA) .............................. u 2017 06206

(51) Int. Cl.
*H04N 5/262* (2006.01)
*G11B 27/34* (2006.01)
(Continued)

(52) U.S. Cl.
CPC .......... *H04N 5/262* (2013.01); *G11B 27/034* (2013.01); *G11B 27/036* (2013.01); *G11B 27/34* (2013.01)

(58) Field of Classification Search
CPC .......... H04N 5/262; H04N 9/74; H04N 21/23; H04N 21/835; G11B 27/034;
(Continued)

(56) References Cited

U.S. PATENT DOCUMENTS 8,943,315 B1    1/2015  Ubl
8,988,611 B1    3/2015  Terry
(Continued)

FOREIGN PATENT DOCUMENTS

RU    121637 U1    10/2012

OTHER PUBLICATIONS

International Search Report in Application No. PCT/UA 2017/000074, dated May 24, 2018, 2 pages.

*Primary Examiner* — Girumsew Wendmagegn
(74) *Attorney, Agent, or Firm* — Hickman Becker Bingham Ledesma LLP (57) ABSTRACT

An automated system for creating, processing and editing videos can be used to create videos, informational video clips and any other video materials. The claimed automated system for creating, processing and generating videos comprises at least one video server connected by means of a data transmission network to at least one user computer device, and a data store, wherein the said video server comprises at least one processor configured to execute program instructions contained in a readable memory, and server-based software, at least one unit for authenticating users configured to authenticate, authorize/register the system users and verify the authorized user access to system functions, and a unit for loading data configured to load digital audio visual data and directory databases onto the video server; wherein each of these user computer devices comprises an interface for connection to the data transmission network and client software designed to interact with the video server. The said (Continued)

video server further includes, connected to each other and to the unit for authenticating users and unit for loading data, a unit for generating and assigning unique identifiers, a unit for establishing relationships, a unit for generating a sequence of video fragments, a unit for forming/editing the sequence of video fragments, a unit for applying visual/audio effects, a unit for pre-viewing, a unit for pre-saving, a unit for compiling/rendering video fragments and a unit for storing the results.

15 Claims, 2 Drawing Sheets

(51) Int. Cl.
 *G11B 27/036* (2006.01)
 *G11B 27/034* (2006.01)
(58) Field of Classification Search
 CPC ....... G11B 27/036; G11B 27/34; G06F 15/76; G06F 21/31; G06T 1/00
 USPC ................ 386/280, 281, 282; 707/999.01
 See application file for complete search history.

(56) References Cited

U.S. PATENT DOCUMENTS

| | | | |
|---|---|---|---|
| 2006/0265403 A1* | 11/2006 | Mercer | G11B 19/025 |
| 2011/0026898 A1* | 2/2011 | Lussier | G06F 3/04842 |
| | | | 386/280 |
| 2013/0151970 A1 | 6/2013 | Maha | |
| 2017/0134776 A1 | 5/2017 | Ranjeet et al. | |

* cited by examiner

Fig. 1

Fig. 2

AUTOMATED SYSTEM FOR CREATING, PROCESSING AND GENERATING VIDEOS

FIELD OF INVENTION

The proposed invention relates to automated systems for creating, processing and editing videos and can be used to create videos, informational video clips and any other video materials.

BACKGROUND

With the ever-growing popularity of the Internet, social networks, video services, the need for creating videos on various subjects is growing, for both advertising and entertainment.

In turn, the creation of high-quality videos requires special knowledge, tools and resources from users.

Despite the fact that now there is a huge variety of services and programs that help a user create a video—all of them do not guarantee that in the end a video will be formed in which the basic requirements will be met, namely: theme, consistency, group of actors (or characters), linear plot, narrative.

From the prior art it is known an automated system for creating and editing clips in an Internet browser for subsequent delivery to advertising media, 'Video Mixer', containing a web server connected via an Internet browser to a user computer, characterized in that the following units are formed on the web server: a unit for authenticating users, four elements OR, a unit for 'Video Mixer' operation in guest mode, a unit for 'Video Mixer' operation in full mode, a unit for creating a new video clip, a template selection unit, a unit for entering a video clip name, a unit for editing scenes of a clip, a unit for selecting background music, a unit for viewing a clip, a unit for selecting an existing clip, a unit for saving a clip to the store, and a controller for refusing to save the clip, while the output of the unit for authenticating users is connected to the first element OR, one output of which is connected to the first input of the unit for creating a new clip, via the unit for 'Video mixer' operation in guest mode, and the other one, through the unit for 'Video mixer' operation in full mode, is connected to the second element OR, one output of which is connected to the third element OR, and the other one—through the series-connected unit for creating a new clip, unit for selecting a template, unit for entering a clip name, unit for editing scenes of a clip, unit for selecting background music, unit for viewing a clip—is connected to the fourth element OR, one output of the third element is EITHER connected to the third input of the unit for creating a new clip, and the other one is connected to the second input of the unit for editing scenes of a clip through the unit for selecting an existing clip, one output of the fourth element is EITHER connected to the unit for saving a clip to the store, and the other one—to the controller for refusing to save the clip, while the output of the unit for saving a clip to the store is the output of the system (Patent RU No. 121637, IPC G09F19/00, published Oct. 27, 2012). The implementation of this system is only possible using certain preprepared templates, which narrows its scope of application. In addition, creation of video clips does not use video segments, but only photographs or texts of an advertisement message, which narrows the capabilities of this automated system.

A movie production system, which includes a computer system having machine readable memory and at least one processor executing a plurality of program modules is known in the prior art. The computer system includes actor defined scene input data stored on the memory and that defines one or more scenes to be included in a movie. The program modules include a screenplay module, a virtual director module, and a movie compiler module. (U.S. Pat. No. 8,988,611 B1, IPC G06F3/048, H04N5/222, published Mar. 24, 2015). However, this system is tied to a specific automatic touch-operated photo and video studio, which narrows the capabilities of this system.

An automated video editing system that uses heuristics and parameters on video footage to provide a condensed version of the footage is known in the prior art. The editing system automatically provides either a finished condensed version of the footage, or selects a plurality of clips based on the heuristics and parameters. The clips can be further edited by a user to produce a condensed version. The condensed version can be transferred to any desired storage media suitable for storing video. A user interface enables the user to select heuristics to identify video clips from the footage. Parameters are also set to automatically edit the clips in a desired manner. Temporal combinations of heuristics and parameters form templates, which are used to assemble desired clips for selected types of events (U.S. Pat. No. 7,248,778 B1, IPC H04N5/76, H04N5/91, G11B27/34, H04N5/93, G11B27/034, published Jul. 24, 2007). This system is difficult for implementation.

A method and system for creating, producing and distributing video templates and video clips, which are designed for assisting end users to create customized video clips, is known in the prior art (US Patent 20100153520 A1, IPC G06F3/048, G06F15/16, published Jun. 17, 2010). Using such a system, a user can create short versions of clips, save the best clips for viewing by other users. However, it may take a very long time to edit a longer video. In addition, the system is not intended for automatic selection of video segments, united by a common sense, into a finished video clip.

A computer system for generating audio-visual projects, which enables a user to generate an audio-visual project using a template (templates) is known in the prior art (U.S. Pat. No. 9,508,385 B2, IPC H04N21/472, H04N21/478, H04N21/845, H04N5/93, H04N21/4788, A63F13/86, A63F13/63, A63F13/655, G11B27/034, G11B27/10, published Nov. 29, 2016). Although a user can control the process of creating a finished project, this system does not allow creation of an automatic photo demonstration videos that meet higher requirements, and as a result of user errors, a project that does not meet the technical criteria can be created, and editing the project and introducing changes into it involves a lengthy process of video rendering.

A system for distributed multimedia production, in which a digital multimedia platform is available to a plurality of collaborators of a video project through a networked computing system for mapping script information is also known in the prior art. In one embodiment, the system includes a tools module, an authentication module, a compilation module, and a script writing tool. The tools module enables editing of a multimedia project by collaborators. The authentication module assigns roles and privileges to collaborators. The compilation module receives files and information from collaborators (Patent US 20130151970 A1, IPC H04N21/854, published Jun. 13, 2013). The joint work of the collaborators burdens the operation of the known system, and as a result, a rather long time is required to create a video. Also, when implementing this system, editing the video and introducing changes to it is associated with a long technological process of rendering a video project. In addition, the system does not provide automatic selection of video clips.

The objective of this invention is to create an automated system for creating, processing and generating videos, in which, through the use of new modules and the relationships between them, it is possible to automatically generate a customizable sequence of video fragments, increase the speed of a video creation, and the use of unique hash identifiers enables instant finding of the necessary information at any rate of data quantity growth.

SUMMARY

The problem is solved in that an automated system for creating, processing and generating videos is proposed, comprising at least one video server connected by means of a data transmission network to at least one user computer device, and a data store, wherein the said video server comprises at least one processor configured to execute program instructions contained in a readable memory, and server-based software, at least one unit for authenticating users configured to authenticate, authorize/register the system users and verify the authorized user access to system functions, and a unit for loading data configured to load digital audio visual data and directory databases onto the video server; each of these user computer devices comprises an interface for connection to the data transmission network and client software designed to interact with the video server. The said video server 1 further includes, connected to each other and to the units for authenticating users and unit for loading data, a unit for generating and assigning unique identifiers, a unit for establishing relationships 8, a unit for generating a sequence of video fragments, a unit for forming/editing the sequence of video fragments, a unit for applying visual/audio effects, a unit for pre-viewing, a unit for pre-saving, a unit for compiling/rendering video fragments and a unit for storing the results, where:

the unit for generating and assigning unique identifiers comprises means for generating a unique hash identifier for each data that is loaded in the unit for loading data;

the unit for establishing relationships is configured to establish relationships between the data loaded into the system using the hash identifier by means of the unit for generating and assigning unique identifiers;

the unit for generating a sequence of video fragments is configured to automatically generate a sequence of video fragments based on input data received from a user;

the unit for forming/editing the sequence of video fragments is configured to edit the previously generated sequence of video fragments based on input commands received from a user;

the unit for applying visual/audio effects is configured to add/edit visual/audio effects to the previously generated sequence of video fragments;

the unit for pre-viewing is configured to pre-generate the video based on the sequence of video fragments and/or added special effects;

the unit for pre-saving is configured to save the sequence of video fragments and/or the sequence of video fragments with special effects added, to the data store;

the unit for compiling/rendering video fragments is configured to generate a video file based on user input data as well as data obtained from the unit for pre-saving and to save the specified video file to the video server data store;

the unit for storing the results is configured to save the generated digital video file to the user computer device and to provide access to download the specified digital video file by other users, while the said units are configured to store data in the data store, which further comprises a bunch of established dependencies.

The claimed invention has several advantages. The proposed system uses unique hash identifiers that are assigned to any data entered to the data store. Moreover, in the process of assigning the said identifiers, dependencies between the input video fragments are established, which enables the system means to automatically generate the desired sequence of data, namely, the sequence of video fragments needed to create a complete video.

BRIEF DESCRIPTION OF THE DRAWINGS

The invention will now be described with reference to illustrative material, where.

PREFERRED EMBODIMENT OF THE INVENTION

Figure 1:
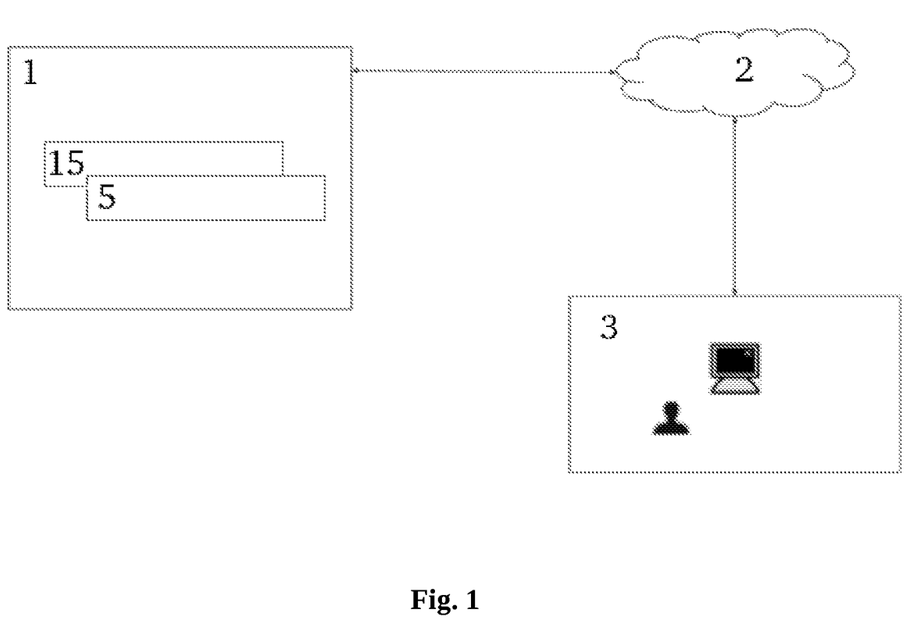
FIG. 1 shows an exemplary diagram of the proposed system, FIG. 2 schematically shows the structure of a video server.

The proposed automated system for creating, processing and generating videos (as shown in FIG. 1) comprises a video server 1 connected by means of a data transmission network 2 to at least one user computer device 3, and a data store 4. User computer device 3 contains an interface for connecting to a data transmission network 2 and installed client software designed to interact with a video server 1.

Terms used in the description:

A user means one person (it can also be a group of people). Users can have various roles (which limit, or vice versa, expand the possibilities of using certain parts of the system).

A user computer device is a personal computer, a tablet, a smart phone, etc. These devices must have an output unit (for example, a display, a computer screen, or other), as well as input units (a keyboard or other). The user device must have a network connection interface (the Internet or other).

Client software is an application based on a client-server architecture. A client sends http requests to the video server using the network interface available to the client and receives a response from the video server with the result of the request execution. Transfer of requests from the client to the video server and back can be done using the Internet connection (if the servers are located on a remote machine), or using the Intranet (if the servers and the client are located on one and the same local network). One of the options can serve as a client:

Internet browser of the user;
desktop application;
mobile application,
and others.

The client software is configured to send requests to the video server, as well as to receive responses from the video server. RestAPI (or other possible solutions) can serve as an example of the interaction between the client and the server, which may as well include ApiToken as a request authorizer.

A Video Server is a remote computer connected to a network, such as the Internet. The Video Server must have at least one processor that will execute program instructions that are stored in a readable memory. No restrictions are imposed on the number of processors (except for the minimum) and the types of processors used. There are also no restrictions on the programming language in which program instructions can be written, and there are also no restrictions on the type and size of the readable memory. Also, the server must have a network interface, and provide the possibility to connect to it via the Internet, or any other type of network. The Video Server also contains a plurality of program units that provide the functionality of the system.

Data network: any network can be used as the network, which will allow the Video Server and the user device to communicate. For example, it may be either the Internet, or not the Internet network.

A video fragment is a video segment containing any video information and having any available format (for example, .avi, .mpeg, .flv, .webm and other well-known similar solutions).

A video file is a file that is formed by combining video fragments in sequence according to the formed sequence of actions of the system user or to the sequence automatically generated by the video server.

A video is the end result of system user actions. The video must meet the following requirements:
1. Each subsequent video fragment must be logically (in terms of meaning) associated to the previous one.
2. Selected video fragments must not contradict each other in terms of a group of actors.
3. Selected video fragments must not contradict each other in terms of style.
4. Selected video fragments together must form a linear plot.
5. Selected video fragments must not contradict each other in terms of genre.

As a result, the selected video fragments, as a whole, must form a narrative.

A data store is an information storage device on a video server designed to store data, directory databases and established dependencies, for example, by style, theme, cast (group), genre (from previously downloaded directory databases).

A hash identifier is a unique identifier automatically generated by the system for all data that is loaded in the unit for loading data, and it is possible to uniquely identify any data loaded into the system by hash identifiers. The use of unique hash identifiers enables storing data in the data store in a strictly established order and instant finding of the necessary information at any rate of data quantity growth. Hash identifiers uniqueness is limited to $2^{128}$. The UUID identification standard can serve as an example of implementation.

The Video Server 1 comprises at least one processor configured to execute program instructions contained in the readable memory, and the server software.

Databases can be stored both on the video server itself, and on a database server or on other storage systems connected via the network 2. Other devices (servers) can connect to the video server, and, as a result, the processor will execute the necessary program instructions.

Figure 2:
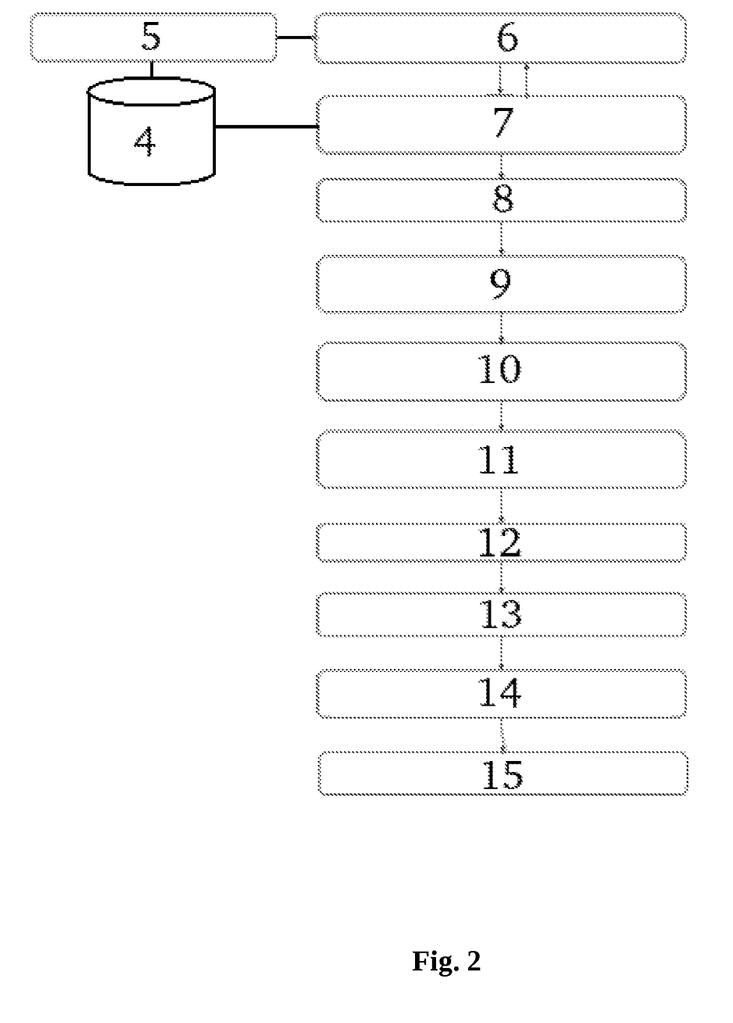

The Video Server 1 comprises a plurality of program units that provide the functionality of the system (as shown in FIG. 2).

The list of units and their functions:

1) Unit for authenticating users 5: this unit implements the functionality of authentication, authorization/registration of system users; for this, the processor executes program instructions of this unit, which are stored in the readable memory. This unit implements the functionality of verifying the authorized user access to various units/system functions. User data is stored in the data store 4.

2) Unit for loading data 6: this unit provides loading of digital audio visual data to the server, as well as loading of 'directories' (a theme directory, a directory of styles, a directory of groups of actors, a directory of genres, etc.). At the same time, the processor executes this unit's program instructions, which are stored in the readable memory.

3) Unit for generating and assigning unique identifiers 7: this unit implements the functionality of generating a hash identifier (and binding it to the loaded data in the data store 4). The means of this unit execute a generation algorithm, which ensures the generation of a unique key, so that the identifier is unique, and the second same identifier is not generated. This hash is unique, and is generated for every data that is loaded into the unit for loading data 6 (thus, it is always possible to uniquely identify any data loaded into the system using hash).

4) Unit for establishing relationships (dependencies) 8: this unit implements the functionality of establishing relationships (dependencies) between the data loaded into the system (which is loaded into the unit for loading data 6) using the hash identifier (by means of the unit for generating and assigning unique identifiers 7). The established dependencies are stored in the data store 4. User access to the functionality of this unit is controlled by the unit for authenticating users 5.

5) Unit for generating a sequence of video fragments 9: this unit provides automatic generation of a sequence of fragments (a future video) based on input data received from the user (theme, genre, etc.), while the processor executes this unit's program instructions, which are stored in the readable memory. The generated sequence is formed from the list of video fragments (which were loaded using the unit for loading data 6), based on the choice of dependencies (set in the unit for establishing relationships (dependencies) 8) and hash identifiers (which were assigned to the input data using the unit for generating and assigning unique identifiers 7). User access to the functionality of this unit is controlled by the unit for authenticating users 5.

6) Unit for forming/editing the sequence of video fragments 10: this unit ensures editing of the previously generated sequence (the sequence generated in the unit for generating a sequence of video fragments 9 or in the unit for pre-saving 13), based on input commands received from the user, while the processor executes this unit's program instructions, which are stored in the readable memory. The functionality of the unit 10 enables adding video fragments to different parts of the sequence, that is, specifying a hash identifier, that was previously generated by the unit for generating and assigning unique identifiers 7, of any video fragment out of all the possible ones loaded into the system in the unit for loading data 6, while the insert/relocation/replacement function is provided to the user based on verification of relationships (indicated in the unit for establishing relationships (dependencies) 8) between the variable elements and the sequence of video fragments. Thus, by changing the sequence of video fragments, as well as its individual elements, the user will not be able to indicate elements that do not correspond to each other, as well as to other criteria. User access to the functionality of this unit is controlled by the unit for authenticating users 5.

7) Unit for applying visual/audio effects 11: this unit implements the functions of adding/editing special visual/sound, text and other effects, which were added in the unit for loading data 6, to the generated sequences of video fragments, which were formed in the unit for generating a sequence of video fragments 9 and/or the unit for forming/editing the sequence of video fragments 10, while the processor executes the program instructions of this unit. User access to the functionality of this unit is controlled by the unit for authenticating users 5.

8) Unit for pre-viewing 12: this unit implements the function of preliminary (temporary) generation of a video based on the sequence of video fragments in the unit for generating a sequence of video fragments 9 and/or in the unit for forming/editing the sequence of video fragments 10, and/or added special effects (by means of the unit for applying visual/audio effects 11), while the processor executes program instructions of this unit. User access to the functionality of this unit is controlled by the unit for authenticating users 5.

9) Unit for pre-saving 13: this unit implements the functionality of storing the settings in the data store 4, the settings being the sequence of video fragments in the unit for generating a sequence of video fragments 9 and/or in the unit for forming/editing the sequence of video fragments 10, special effects added by means of the unit for applying visual/audio effects 11. User access to the functionality of this unit is controlled by the unit for authenticating users 5.

10) Unit for compiling/rendering the video 14: this unit implements the video file generation functionality based on the input data (format, size, name) specified by the user, as well as on the data obtained on the basis of the unit for pre-saving 13, while the program instructions of this unit are executed by the processor. The operation of this unit results in the creation of a digital video file, which is stored in the data store 4 of the server 1. User access to the functionality of this unit is controlled by the unit for authenticating users 5.

11) Unit for storing the result 15: this unit implements the functionality of saving (downloading) the digital file generated in the unit for compiling/rendering the video 14 to the user's device, as well as sharing (granting access) of a digital file for downloading by other users, while the processor executes program instructions of this unit. User access to the functionality of this unit is controlled by the unit for authenticating users 5.

The implementation of the invention is illustrated by the following example.

Example 1

Initially, the following data is loaded onto the video server 1 in the unit for loading data 6:
video fragments (digital video files);
themes (a list of themes to which one or another video fragment can be attributed);
genres (a list of genres to which one or another video fragment can be attributed, for example, comedy, animation, etc.);
style (a list of styles);
the cast (or groups, a list of cast members by which one or another video fragment can be compiled);
sound (audio) digital data that can be further used as special effects;
graphic images that can be further used as special effects;
rendering file formats;
resolution (width, height) of the generated videos;
other data.

Also, the necessary directories are loaded into the indicated unit (a theme directory, a directory of styles, a directory of groups of actors, a directory of genres, and others).

At the same time, a unique hash identifier is assigned to all digital video files, this process is implemented by means of the unit for generating and assigning unique identifiers 7. Also, in the unit for establishing relationships 8, relationships (dependencies) between the data loaded to the system are established using hash identifiers.

In one exemplary embodiment of the claimed technical solution, the dependencies between the loaded video fragments may be as follows:
by style;
by theme;
by the cast (group);
by genre (from previously loaded directories).

Next, the dependencies of the loaded video fragments between themselves are established (correspondence of the fragments to each other).

The following example shows the action mechanism of the means within the system of establishing dependencies for the three requirements.

For example, there are 4 loaded video fragments for which a unique hash identifier has been assigned:

| Hash Identifier | Fragment |
| --- | --- |
| HASH1 | Fragment 1 |
| HASH2 | Fragment 2 |
| HASH3 | Fragment 3 |
| HASH4 | Fragment 4 |

For example, there are 4 styles:

| Hash Identifier | Style |
| --- | --- |
| HASH100 | Style 1 |
| HASH200 | Style 2 |
| HASH300 | Style 3 |
| HASH400 | Style 4 |

For example, there are 4 themes:

| Hash Identifier | Theme |
| --- | --- |
| HASH555 | Theme 1 |
| HASH666 | Theme 2 |
| HASH777 | Theme 3 |
| HASH888 | Theme 4 |

For example, there are 4 options for the cast (group):

| Hash Identifier | Cast |
| --- | --- |
| HASH1100 | Cast 1 |
| HASH1200 | Cast 2 |
| HASH1300 | Cast 3 |
| HASH1400 | Cast 4 |

Then, the established relationships/dependencies will be as follows: Correspondence of the video fragment to the style:

| Hash Identifier of the Video Fragment | Hash Identifier of the Style |
| --- | --- |
| HASH1 | HASH200 |
| HASH3 | HASH300 |

-continued

| Hash Identifier of the Video Fragment | Hash Identifier of the Style |
| --- | --- |
| HASH4 | HASH200 |
| HASH3 | HASH200 |
| HASH2 | HASH200 |

Which means that the video fragment with a unique identifier HASH1 corresponds to the style with a unique identifier HASH200, the video fragment with a unique identifier HASH3 corresponds to a unique identifier HASH300, the video fragment with a unique identifier HASH4 corresponds to a unique identifier HASH200, etc.

Correspondence of the video fragment to the theme:

| Hash Identifier of the Video Fragment | Hash Identifier of the Theme |
| --- | --- |
| HASH1 | HASH777 |
| HASH3 | HASH888 |
| HASH4 | HASH777 |
| HASH2 | HASH777 |
| HASH4 | HASH888 |

Which means that the video fragment with a unique identifier HASH1 corresponds to the theme with a unique identifier HASH777, the video fragment with a unique identifier HASH3 corresponds to the theme with a unique identifier HASH888, the video fragment with a unique identifier HASH4 corresponds to a unique identifier of the theme HASH777.

Correspondence of the video fragment to the group of actors:

| Hash Identifier of the Video Fragment | Hash Identifier of the Group |
| --- | --- |
| HASH1 | HASH1300 |
| HASH3 | HASH1300 |
| HASH4 | HASH1300 |
| HASH2 | HASH1300 |

Which means that the video fragment with a unique identifier HASH1 corresponds to the group with a unique identifier HASH1300, the video fragment with a unique identifier HASH3 corresponds to the group with a unique identifier HASH1300, the video fragment with a unique identifier HASH4 corresponds to a unique identifier of the group HASH1300, etc.

Correspondence of one video fragment to the other one:

| Hash Identifier of the Video Fragment | Hash Identifier of the Video Fragment |
| --- | --- |
| HASH1 | HASH3 |
| HASH3 | HASH4 |
| HASH4 | HASH1 |
| HASH2 | HASH4 |
| HASH2 | HASH1 |
| HASH4 | HASH2 |

Which means that the video fragment with a unique identifier HASH1 corresponds to the video fragment with a unique identifier HASH3, the video fragment with a unique identifier HASH3 corresponds to the video fragment with a unique identifier HASH4, the video fragment with a unique identifier HASH4 corresponds to a unique identifier of the group HASH1, etc.

Ultimately, having the dependencies established, when forming a sequence of video fragments (automatic or manual by the user), the system will check whether two successive video fragments can correspond to each other.

When generating a sequence of video fragments automatically, the system will always generate the correct sequence based on the entered correspondence tables.

In case the user forms/edits a sequence of fragments manually, the system will limit the possibility to insert an 'incorrect' (not corresponding to the data indicated in the correspondence table) fragment.

An example of a sequence of fragments:

HASH1=>HASH4=>HASH2—the sequence is correct, all successive fragments do not violate the criteria specified in the tables above.

HASH1=>HASH2=>HASH4—the sequence is correct, all successive fragments do not violate the criteria specified in the tables above.

HASH1=>HASH3—the sequence is not correct and violates the correspondence of the fragment to the theme (as it corresponds to the theme different from the theme for HASH1), as well as the correspondence of fragments to each other (as there are no HASH3-HASH1 fragments in the correspondence table). In this case, the system will offer (based on the correspondence tables) valid options for selection (instead of HASH3 it will be HASH4 or HASH2).

HASH1=>HASH2=>HASH3—the sequence is not correct and violates the correspondence of the fragment to the theme (as it corresponds to the theme different from the theme for HASH2), as well as the correspondence of fragments to each other (as there are no HASH3-HASH2 fragments in the correspondence table). In this case, the system will offer (based on the correspondence tables) valid options for selection (instead of HASH3 it will be HASH4).

HASH1=>HASH2=>HASH4=>HASH3—the sequence is correct, all successive fragments do not violate the criteria specified in the tables above.

As a result, the system will generate such a sequence of video fragments for the user in which the possibility of error is excluded.

User interaction with the system.

The user interacts with the system through an application running on the user's device.

On user's device, the user installs a specially designed application (mobile, browser or desktop) and launches it. As soon as the application is launched the user will see the authorization interface. The data entered by the user is sent to the server and checked (the unit for authenticating users 5 is used). After successful authorization, the user can choose further options (using the menu interface):

load the input data;
establish relationships;
create/edit a video.

When selecting the function of input data loading, the user can see the interface (if access right is available) in which the input data (video fragments, a list of themes, a list of genres, a list of styles, a list of groups of actors, previously saved in the data store 4 and having a unique hash identifier) is loaded into the corresponding fields. Data is sent to the video server 1, and processed by means of units for: authenticating users 5, loading data 6, generating and assigning unique identifiers 7.

When selecting the function of establishing relationships, the user can see the interface with the help of which the admin user establishes relationships between the input data previously loaded into the system. Data is sent to the video server 1, and processed by means of units for: authenticating users 5, establishing relationships (dependencies) 8.

When selecting the function of creating/editing a video, if the user has not previously set up the settings for the video, the user can see the interface for entering the theme of the video being created and/or genre (the list of initial fields that the user can fill is not limited). The entered data is sent to the video server 1, based on which a sequence of video fragments is automatically generated to the user (setting up a future video). The implementation of this functionality involves following units of the video server 1: unit for authenticating users 5, unit for forming/editing the sequence of video fragments 10.

If the video has been previously created, the user can see the interface for selecting previously saved data that is automatically loaded from the data store 4, with the following units of the video server 1 being used: unit for authenticating users 5, unit for forming/editing the sequence of video fragments 10.

The user can see the interface for selecting options for the sequence of fragments shown earlier:
 edit video fragments;
 add special effects to video fragments;
 preview video fragments;
 save settings;
 render a video.

When selecting 'Edit video fragments', the user can see the interface in which the current video fragments are displayed on the time-line. Each video fragment can be replaced by another video fragment from the system, by selecting them from all valid video fragments available. Also, the user can change the sequence of video fragments (relocate them), insert other video fragments between video fragments (or remove video fragments). Every possible user action to edit a sequence of video fragments, namely relocating, inserting a new fragment, deleting a fragment from a sequence, is controlled by means of the unit for establishing relationships (dependencies) 8. Accordingly, every time the system provides only valid video sequences and valid actions over them.

When selecting 'Add special effects to video fragments', the user can see the interface in which special effects are added to the previously set sequence of video fragments. Sound, graphic, text, and other effects are available to the user in the data store 4. Also, the user can add (upload) his own sound, video, photo data.

In this case, the following units of the video server 1 are used: unit for authenticating users 5, unit for forming/editing the sequence of video fragments 10, unit for applying visual/audio effects 11.

When selecting 'Preview', the user can see the interface in which the video player can view a version of the future video, before its final compilation (rendering), taking into account the changes made earlier and the application of special effects. Unit for authenticating users 5, unit for pre-viewing 12 of the video server 1 are used.

When selecting 'Save settings', the user can see the interface through which the function of preliminary saving the sequence of video fragments, as well as special effects, is implemented. The user fills in the form field 'Project Name'. Later, the previously saved 'Project' (a sequence of video fragments with all the settings) can be reopened, and work on it can be continued. The following video server units are used: unit for authenticating users 5, unit for forming/editing the sequence of video fragments 10, unit for applying visual/audio effects 11, and unit for pre-saving 13.

When selecting 'Render a video', the user can see the interface for entering the video file name, format, resolution (directory fields from the data store 4 of the server). After clicking the 'Render' function button, the data is sent to the video server 1, and the function of video rendering (generation) starts. Then the user is shown the result of the video generation. At the same time, it is possible to save or download the result. The following video server 1 units are used: unit for authenticating users 5, unit for forming/editing the sequence of video fragments 10, unit for applying visual/audio effects 11, unit for pre-saving 13, unit for compiling/rendering the video files 14.

When selecting 'Save Results' after the rendering is finished, the user proceeds to the interface for saving the result. The user can download (that is, save the generated video file to his device), save it to the video server 1, or provide other users of the system with access to download the video file. The following video server 1 units are used: unit for authenticating users 5, unit for forming/editing the sequence of video fragments 10, unit for applying visual/audio effects 11, unit for pre-saving 13, unit for compiling/rendering the video 14, unit for saving the result 15.

As a result, a video will be created that meets the user's needs, and in which the logical association between the used video fragments is observed.

The user can repeat the actions named above as many times as necessary.

This example does not impose any restrictions on other possible implementation options and on the possible type and format of application, as well as on the programming language (in which the application is implemented). Also, no restrictions are imposed on the types of devices and operating systems on which the application can run.

The invention claimed is:

1. An automated system for creating, processing and generating videos, the system comprising at least one video server connected to a data transmission network and a data store, the video server comprising at least one processor configured to execute program instructions contained in a readable memory, and server-based software, and a unit for loading data to load digital audio visual data onto the video server;

the video server further comprising, connected to each other:
 a unit for generating and assigning unique identifiers being configured for generating a unique hash identifier for each of the video fragments and data sets uploaded to the unit for loading data and for establishing dependencies between said hash identifiers;
 a unit for establishing relationships being configured to establish relationships between hash identifiers of each of the video fragments and all of the data sets uploaded to the unit for loading data using one or more correspondence tables;
 a unit for generating a sequence of video fragments being configured to automatically generate the sequence of video fragments based on the relationships between hash identifiers formed by the unit for establishing relationships;
 a unit for forming or editing the sequence of video fragments being configured to edit the previously generated sequence of video fragments based on input commands and being configured, in response to the input commands, to check whether two successive video fragments can correspond to each other based upon the correspondence tables, and being configured in response, to limit the creation of an incorrect video fragment in the sequence;

each of the units being configured to store data in the data store, which additionally contains the set of established dependencies based on style, theme, cast or genre of the video fragments.

2. The system recited in claim 1, further comprising a unit configured for applying visual or audio effects by adding visual or audio effects to, or editing visual or audio effect in relation to, the sequence of video fragments, which were formed in the unit for generating a sequence of video fragments and/or in the unit for forming/editing the sequence of video fragments.

3. The system recited in claim 2, further comprising a unit for pre-viewing being configured to pre-generate a digital video file based on the sequence of video fragments, which were formed by the unit for generating a sequence of video fragments and/or by the unit for forming/editing the sequence of video fragments, and with added visual or audio effects.

4. The system recited in claim 2, further comprising a unit for pre-saving being configured to save the sequence of video fragments, or to save a new sequence of video fragments with the visual or audio effects, to the data store.

5. The system recited in claim 4, further comprising a unit for compiling or rendering video fragments being configured to generate a video file based on input data as well as data obtained from the unit for pre-saving and to save the video file to the data store.

6. The system recited in claim 5, further comprising a unit for storing the results being configured to download the digital video file to one or more user computer devices.

7. A computer-implemented method for creating, processing and generating videos, the method being executed using at least one video server connected to a data transmission network and a data store, the video server comprising at least one processor configured to execute program instructions contained in a readable memory, and server-based software, the method comprising:

loading digital audio visual data onto the video server;

generating a unique hash identifier for each of a plurality of video fragments and data sets uploaded to a unit for loading data of the video server;

establishing dependencies between hash identifiers of each of the video fragments and all of the data sets uploaded to the unit for loading data using one or more correspondence tables;

automatically generating a sequence of video fragments based on the relationships between hash identifiers formed by the unit for relationships establishment;

editing the previously generated sequence of video fragments based on input commands and, in response to the input commands, checking whether two successive video fragments can correspond to each other based upon the correspondence tables, and in response, including limiting the creation of an incorrect video fragment in the sequence.

8. The method of claim 7, further comprising adding or editing visual effects or audio effects in relation to the previously generated sequence of video fragments.

9. The method of claim 8, further comprising pre-generating a video based on the sequence of video fragments and visual effects or audio effects.

10. The method of claim 7, further comprising pre-saving the sequence of video fragments, or a new sequence of video fragments with special effects added, to the data store.

11. The method of claim 10, further comprising compiling or rendering video fragments to result in generating a digital video file based on input data and the sequence of video fragments that have been pre-saved, and saving the video file to data store.

12. The method of claim 11, further comprising downloading the digital video file to one or more user computer devices.

13. The method of claim 7, further comprising generating the unique hash identifier for each of the video fragments and binding the unique hash identifiers respectively to each of the video fragments.

14. The method of claim 7, the loading further comprising loading, onto the video server, data specifying one or more of: a list of themes to which one or another video fragment can be attributed, a list of genres to which one or another video fragment can be attributed; a list of styles; a list of cast members by which one or another video fragment can be compiled; audio digital data that can be further used as special effects; graphic images that can be further used as special effects; rendering file formats; resolution of the generated videos.

15. The method of claim 7, the established dependencies relating to one or more of style, theme, cast, genre of video fragments.

* * * * *